US007191658B2

(12) United States Patent
Oda et al.

(10) Patent No.: US 7,191,658 B2

(45) Date of Patent: Mar. 20, 2007

(54) PRESSURE-DETECTING DEVICE AND METHOD OF MANUFACTURING THE SAME

(75) Inventors: Teruo Oda, Gamagori (JP); Inao Toyoda, Anjo (JP)

(73) Assignee: DENSO Corporation, Kariya (JP)

( * ) Notice: Subject to any disclaimer, the term of this patent is extended or adjusted under 35 U.S.C. 154(b) by 20 days.

(21) Appl. No.: 11/142,430

(22) Filed: Jun. 2, 2005

(65) Prior Publication Data

US 2005/0274189 A1 Dec. 15, 2005

(30) Foreign Application Priority Data

Jun. 11, 2004 (JP) ............................ 2004-173708
Jun. 29, 2004 (JP) ............................ 2004-191244

(51) Int. Cl.
*G01L 11/00* (2006.01)

(52) U.S. Cl. ......................... 73/702; 73/704; 73/35.03; 73/35.09

(58) Field of Classification Search .................. 73/702, 73/704, 35.12, 35.03, 35.09
See application file for complete search history.

(56) References Cited

U.S. PATENT DOCUMENTS 4,337,643 A * 7/1982 Yamaguchi et al. ....... 73/35.09
4,637,245 A * 1/1987 Iwata et al. ................ 73/35.03
2006/0090544 A1* 5/2006 Yorita et al. ............... 73/35.12

FOREIGN PATENT DOCUMENTS

JP A-5-34231 2/1993
JP A-2004-334692 11/2004

* cited by examiner

*Primary Examiner*—Andre J. Allen
(74) *Attorney, Agent, or Firm*—Posz Law Group, PLC

(57) ABSTRACT

One end of a rod-like pressure-conveying member is disposed in a sensing unit, and the other end extends into and through an insertion hole of an engine. A combustion pressure, to which the other end of the rod-like member is exposed, is conveyed to the sensing unit through the pressure-conveying member for the detection of the combustion pressure. The pressure-conveying member resonates at a knocking frequency $f_n$ of the engine and the knocking frequency $f_n$ is detected based on the resonance of the pressure-conveying member.

4 Claims, 8 Drawing Sheets

202
Y
13
10d
200
10c
201
11
80
22
10b
10
10a
21
20
23
40
42
30
45
45
42
50
12
63
44
70
61
100

PRESSURE-DETECTING DEVICE AND METHOD OF MANUFACTURING THE SAME

CROSS-REFERENCE TO RELATED APPLICATION

This application is based on Japanese Patent Applications No. 2004-173708 filed on Jun. 11, 2004, and No. 2004-191244 filed on Jun. 29, 2004, the disclosure of which are incorporated herein by reference.

FIELD OF THE INVENTION

This invention relates to a pressure-detecting device wherein the combustion pressure of an engine is conveyed through a rod-like pressure-conveying member to a sensing unit which outputs a signal in accordance with the conveyed pressure. The pressure-detecting device can be applied to sensors of combustion pressure.

RELATED ART OF THE INVENTION

Pressure-detecting devices, each comprising a sensing unit, which outputs signals in accordance with pressure, and a rod-like pressure-conveying member, of which one end is disposed on the side of the sensing unit and of which the other end extends out of the sensing unit, have already been proposed (for example, JP-5-34231A). A strain gauge, for example, is used as the sensing unit.

The pressure-detecting devices with a rod-like pressure-conveying member are applied to sensors of combustion pressure (so-called cylinder pressure) of engines and the like.

Specifically, the end of the rod-like pressure-conveying member extending out of the sensing unit is inserted into a hole of an engine. The combustion pressure of the engine working on the end of the rod-like pressure-conveying member is conveyed to the sensing unit through the pressure-conveying member for the detection of the combustion pressure.

When knocking signals are measured by a sensor of combustion pressure of prior art, the resonance point of the pressure-conveying member of the sensor overlaps the frequency of knocking signals and knocking signals of small magnitude of pressure are drowned out by the noise due to the resonance of the pressure-conveying member. Thus, the measurement of knocking signals is relatively difficult.

Referring to FIG. 5, the above problem will be described more specifically. FIG. 5 shows an ordinary waveform of combustion pressure $W_o$. A waveform of knocking $W_n$ is put on the waveform of combustion pressure $W_o$. "$f_0$" and "$f_n$ in FIG. 5 stand for the frequency of combustion pressure and the frequency of knocking, respectively.

Because the frequency of knocking $f_n$ is considerably higher than the frequency of combustion pressure $f_0$, combustion-pressure signals of which frequency $f_0$ is lower than the frequency of knocking $f_n$ are eliminated by a low-pass filter (LPF). Thus, the pressure signals of knocking can be extracted.

However, pressure signals of knocking are very small as compared with pressure signals of combustion pressure. Besides, various noises such as resonance of the pressure-conveying member with knocking and mechanical noises of the engine, or pseudo-knocking, may overlap the pressure signals of knocking.

In this case, the pressure signals of knocking are buried under the noises and it is difficult to distinguish the former from the latter. Therefore, the resonance frequency of the pressure-conveying member has to be kept away from the frequency band of knocking by adjusting the size of the pressure-conveying member and so on.

If the resonance frequency of the pressure-conveying member is kept away from the frequency band of knocking so that the noise due to the resonance of the pressure-conveying member does not overlap the pressure signals of knocking, the pressure signals of knocking remain small and errors may occur in distinguishing the pressure signals of knocking from the noise.

In the above conventional pressure-detecting device, the present inventor tried placing a pressure-sensing element closer to the side of the pressure-detecting environment in order to improve the sensor characteristics. Namely, the inventor tried decreasing the distance between a pressure-receiving diaphragm and the pressure-sensing element by making the pressure-conveying member shorter.

The reason for shortening the pressure-conveying member is as follows: When the pressure-detecting device is applied to a sensor of combustion pressure of an engine, for example, if the pressure-conveying member is long, the resonance frequency of the pressure-conveying member overlaps the frequency of knocking signals, which causes the resonance of the pressure-conveying member.

Then, knocking signals of small magnitude of pressure are drowned out by the noise due to the resonance of the pressure-conveying member.

Further, if the pressure-conveying member is long, the pressure-conveying member itself is liable to deform. Thus, the condition of contact between the pressure-conveying member and the pressure-receiving diaphragm and the condition of contact between the pressure-conveying member and the pressure-sensing element may change. When such a change in the condition of contact arises, the deterioration in the pressure-conveying precision is caused, affecting the sensor characteristics.

In this regard, if the pressure-sensing element is placed closer to the side of the pressure-detecting environment, the pressure-sensing element becomes closer to the pressure-receiving diaphragm to reduce the length of the pressure-conveying member. Thus, the problems of resonance and deformation liable to occur to the long pressure-conveying member can be minimized.

Conventionally, in the pressure-detecting device of this kind, a housing constituting the body of the device is provided with signal processing units such as a connector unit to take out signals from the pressure-sensing element. In the conventional device, the pressure-sensing element and the signal processing units are electrically connected by wire bonding or the like.

However, when the pressure-sensing element is placed closer to the side of the pressure-detecting environment, the distance between the pressure-sensing element and the signal processing units increases as much as the length of the pressure-conveying member shortened. Accordingly, when electrically connecting the pressure-sensing element with the signal processing units, the conventional wire bonding cannot serve the purpose.

In the case when connecting the pressure-sensing element and the signal processing units placed so apart that wire bonding cannot serve the purpose, considering the ease of handling, size reduction, ease of connection and so on, the inventor determined to use a flexible printed circuit board as a means of connection.

For decreasing the distance between the pressure-sensing element and the pressure-receiving diaphragm by shortening the length of the pressure-conveying member, and for using a flexible printed board to connect the pressure-sensing element with the signal processing units including the connector unit, the inventor built a prototype of the pressure-detecting device shown in FIG. 10.

FIG. 10 is a schematic sectional view showing a whole configuration of a pressure-detecting device built as a prototype by the inventor.

The pressure-detecting device can be applied to a sensor of combustion pressure of an engine. In this case, a pipe section 312 of the housing 310 is threadedly engaged with a threaded hole of an engine block of the engine and the pressure-detecting device detects the pressure inside the combustion chamber (cylinder pressure) of the engine.

The metal housing 310 comprises a cylindrical body 311 and the cylindrical pipe section 312 extending from the body 311. A male thread section 313 is formed on the periphery of the pipe section 312 of the housing 310 for the thread engagement with the engine block.

In the pressure-detecting device, the tip of the pipe section 312 of the housing 310 is fitted with a pressure-sensing element 330 which outputs signals in accordance with pressure. The pressure works on the pressure-sensing element 330 as shown by the arrow "Y" in FIG. 10.

The pressure-sensing element 330 is fitted, with molten glass, onto the surface of a diaphragm 322 of a hollow cylindrical metal stem 320. The metal stem 320 serves as a support and has an opening 321 at one end and the diaphragm 322 at the other end.

A pressure-conveying member 316 is provided in the hollow of the metal stem 320, and a pressure-receiving diaphragm 315 is welded onto the top of the metal stem 320 so as to cover the opening 321.

The pressure is, as shown by the arrow "Y" in FIG. 10, conveyed from the pressure-receiving diaphragm 315 to the rear surface of the diaphragm 322 of the metal stem 320 through the pressure-conveying member 316.

When the diaphragm 322 of the metal stem 320 deforms under pressure, an electric signal corresponding to the deformation is outputted from the pressure-sensing element 330.

As shown in FIG. 10, a circuit board 340 is provided in the body 311 of the housing 310. Also, an IC chip 342 is fixed onto the upper surface of the circuit board 340 by gluing, and formed on the IC chip 342 is a circuit to process signals outputted from the pressure-sensing element 330.

The IC chip 342 and the circuit board 340 are electrically connected by bonding wires 344. Besides, the circuit board 340 and the pressure-sensing element 330 are electrically connected by a flexible printed circuit board 350. The flexible printed circuit board 350 is provided such that it extends in the pipe section 312 of the housing 310 along the length of the pipe section 312.

One end 351 of the flexible printed circuit board 350 is electrically joined to the pressure-sensing element 330, and a portion on the side of the other end 352 extends through the pipe section 312 toward the circuit board 340. The other end 352 of the flexible printed circuit board 350 is electrically connected to the circuit board 340 by soldering or the like.

Further, a connector case 360 with a terminal 361 is disposed below the circuit board 340 in the housing 310. The connector case 360 is provided as a connector unit to take out signals from the pressure-sensing element 330.

The terminal 361 of the connector case 360 and the circuit board 340 are electrically connected by a spring 362. Thus, the pressure-sensing element 330 is electrically connected to the connector case 360, or the connector unit 360, through the flexible printed circuit board 350 and the circuit board 340.

According to the pressure-detecting device shown in FIG. 10, the pressure-sensing element 330 is disposed at the tip of the pipe section 312 to minimize the length of the pressure-conveying member as compared with the prior art pressure-conveying member in which the pressure-conveying member extends along the whole length of the pipe section. In this example, the pressure-conveying member 316 is housed in the metal stem 320, the former being as substantially short as the latter.

As in the conventional method for manufacturing the pressure-detecting device of this kind, in the present prototype, after the pressure-sensing element 330 is fixed to the metal stem 320 serving as a support with molten glass or the like, the pressure-receiving diaphragm 315 is welded to the metal stem 320 while the pressure-conveying member 316 is put between the pressure-sensing element 330 and the pressure-receiving diaphragm 315.

Then, in the assembly of the metal stem 320, the pressure-sensing element 330, and pressure-receiving diaphragm 315, the flexible printed circuit board 350 is connected to the pressure-sensing element 330 and, while inserting the flexible printed circuit board 350 into the pipe section 312 of the housing 310, the metal stem 320 is mounted on the tip of the pipe section 312.

The pressure-receiving diaphragm 315 is welded while a load is applied to the surface of the pressure-receiving diaphragm 315 so that the rear side of the pressure-receiving diaphragm 315 presses the diaphragm 322 of the metal stem 320 through the pressure-conveying member 316.

In such a manufacturing method, when welding the pressure-receiving diaphragm 315, the pressure-conveying member 316 applies a load to the diaphragm 322 of the metal stem 320 serving as a support and the pressure-receiving diaphragm 315. There are following two reasons why the welding is conducted while applying a load.

The first reason is as follows: If both the ends of the pressure-conveying member 316 are in contact with the diaphragm 322 of the metal stem 320 and the pressure-receiving diaphragm 315, almost no loads being applied to them, the pressure-conveying member 316 loses contact with at least one of the diaphragms 322 and 315 when the pressure-conveying member 316 contracts due to its linear expansion coefficient.

The second reason is as follows: When the pressure-detecting device is applied to a sensor of combustion pressure of an engine, the pressure inside the combustion chamber may become negative. Accordingly, the pressure-receiving diaphragm 315 may bulge out and lose contact with the pressure-conveying member 316.

Thus, to secure the contact between the pressure-conveying member 316 and the metal stem 320 as well as the pressure-receiving diaphragm 315, by welding the pressure-receiving diaphragm 315 while applying a load to it, both the ends of the pressure-conveying member 316 are put in contact with the diaphragm 322 of the metal stem 320 and the pressure-receiving diaphragm 315 after the assembly so as to apply certain loads to the diaphragms 322 and 315.

However, the method of welding the pressure-receiving diaphragm 315 to the metal stem 320 after fixing the pressure-sensing element 330 to the metal stem 320 serving as a support with molten glass or the like has following problems.

The first problem is as follows: The influence of the heat caused by welding is not negligible since the pressure-conveying member 316 is shortened and the distance between the welded portion of the pressure-receiving diaphragm 315 and the pressure-sensing element 330 is decreased. Therefore, the heat caused by the welding of the pressure-receiving diaphragm 315 gives thermal damage to the pressure-sensing element 330 on the metal stem 320.

The second problem is as follows: After gluing the pressure-sensing element 330 onto the metal stem 320, the pressure-receiving diaphragm 315 is welded while a load is applied from the pressure-conveying member 316 to the pressure-sensing element 330 through the diaphragm 322 of the metal stem 320. Therefore, the load applied remains in the pressure-sensing element 330 after the welding of the pressure-receiving diaphragm 315, and this leftover load causes an offset of the output.

Thus, the pressure-detecting device, wherein the pressure-sensing element outputting signals in accordance with pressure is fixed to the support, the pressure-conveying member is put between the pressure-sensing element and the pressure-receiving diaphragm, and the pressure-receiving diaphragm is welded to the support has problems such as thermal damage to the pressure-sensing element during the welding of the pressure-receiving diaphragm and the offset of the output caused by the load during the welding.

SUMMARY OF THE INVENTION

Under the circumstances, the object of the present invention is to provide a pressure-detecting device wherein the combustion pressure of an engine is conveyed through a rod-like pressure-conveying member to a sensing unit for outputting a signal in accordance with the conveyed pressure and which is capable of detecting knocking more reliably.

Also, in view of the above, another object of the present invention is to provide a pressure-detecting device wherein when the pressure-receiving diaphragm is welded to the support, the pressure-sensing element is prevented from being thermally damaged and being exposed to a load which may cause the offset.

The pressure-detecting device of the present invention comprises a sensing unit, which outputs signals in accordance with pressure, and a rod-like pressure-conveying member, of which one end is disposed on the side of the sensing unit and of which the other end extends out of the sensing unit, into a hole made in an engine. The combustion pressure working on the end of the pressure-conveying member, which is inserted in the hole, is conveyed through the pressure-conveying member to the sensing unit for the detection of the combustion pressure. The pressure-conveying member is designed to resonate at the frequency of knocking of the engine, and the frequency of knocking is detected based on the resonance of the pressure-conveying member.

Because the knocking frequency is extracted based on the resonance of the pressure-conveying member according to the present invention, it will do for the detection of knocking if it is checked whether a signal of knocking frequency has been outputted or not, no matter how large or small the amplitude of the signal of knocking frequency is.

Accordingly, the pressure-detecting device of the present invention is capable of detecting knocking more reliably than the pressure-detecting devices of prior art.

To achieve the above objects, according to the present invention, the following aspect characterizes the method for manufacturing a pressure-detecting device wherein the pressure-sensing element outputting signals in accordance with pressure is fixed to the support, and the pressure-receiving diaphragm is welded to the support while the pressure-conveying member is put between the pressure-sensing element and the pressure-receiving diaphragm, and the pressure working on the pressure-receiving diaphragm is conveyed through the pressure-conveying member to the pressure-sensing element for the detection of the pressure.

Namely, according to the present manufacturing method, the pressure-conveying member is put between the support and the pressure-receiving diaphragm, the pressure-receiving diaphragm is welded to the support while the pressure-receiving diaphragm applies a load to the support through the pressure-conveying member, and then the pressure-sensing element is fixed to the support.

According to such a method, the pressure-receiving diaphragm is welded to the support while the pressure-receiving diaphragm applies a load to the support through the pressure-conveying member before the pressure-sensing element being fixed to the support.

Thus, the contact between the pressure-conveying member and the support and the contact between the pressure-conveying member and the pressure-receiving diaphragm are secured.

Besides, when the pressure-receiving diaphragm is welded to the support while a load is applied, the support is not fitted with the pressure-sensing element; therefore, the pressure-sensing element is not thermally damaged by the welding or exposed to a load.

Thus, according to the present invention, when the pressure-receiving diaphragm is welded to the support, the pressure-sensing element is prevented from being thermally damaged and being exposed to a load which may cause an offset.

DESCRIPTION OF THE PREFERRED EMBODIMENTS (First Embodiment)

Figure 1:
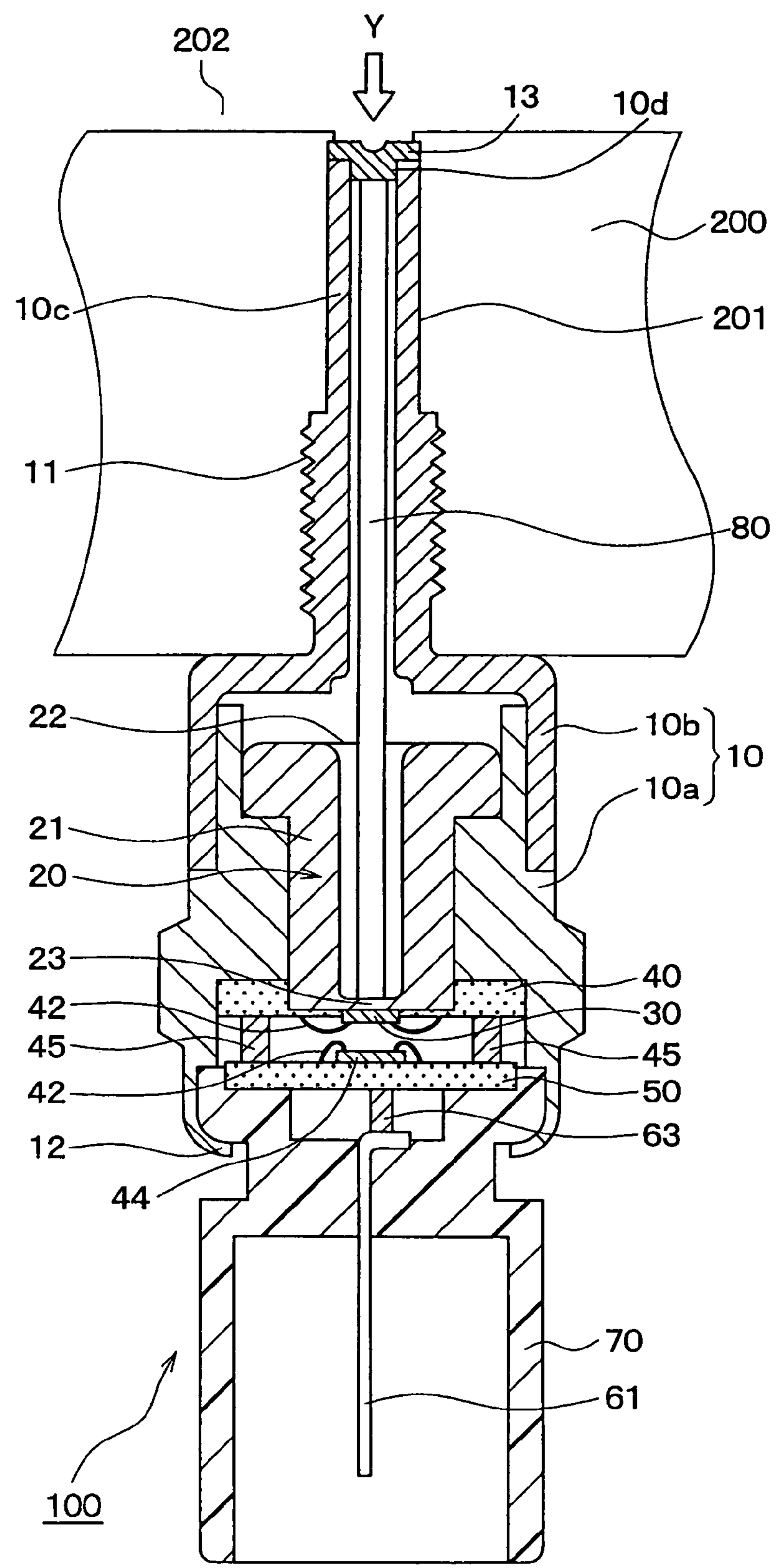
FIG. 1 is a schematic sectional view of an embodiment of the pressure-detecting device of the present invention.
Figure 2A:
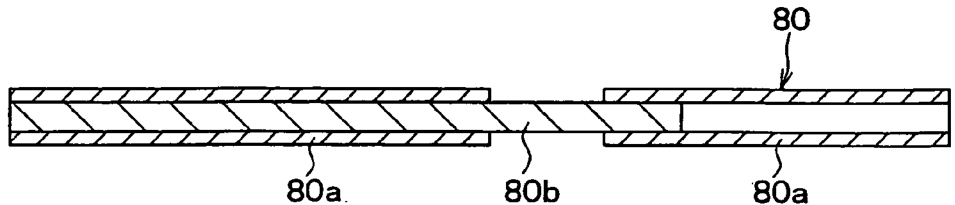
FIGS. 2A to 2E are schematic sectional views of a pressure-conveying member of the pressure-detecting device.
Figure 2B:
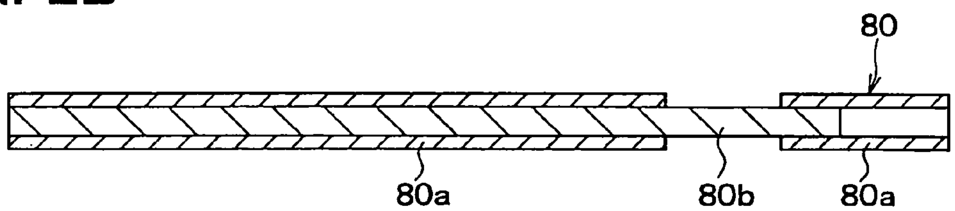
Figure 2C:
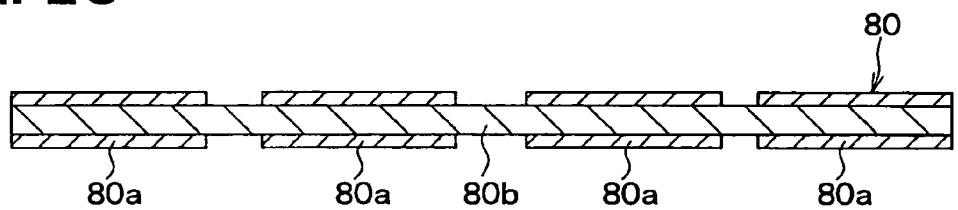
Figure 2D:
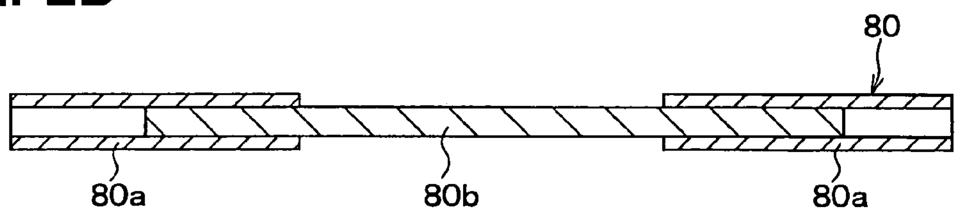
Figure 2E:
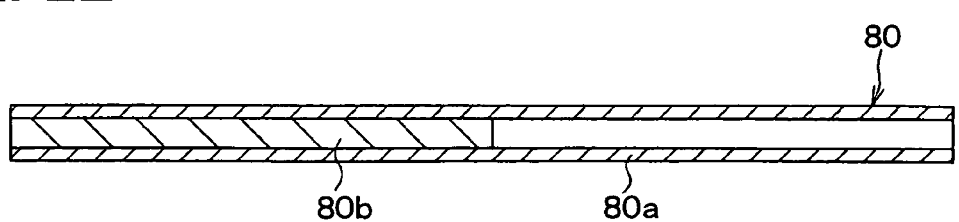

The first embodiment of the present invention will be described below by referring to drawings. FIG. 1 is a schematic sectional view of the pressure-detecting device 100 according to the first embodiment. The pressure-detecting device 100 is fitted to an engine 200.

The pressure-detecting device 100 has a housing 10 with a pipe section 10*c*, and the pipe section 10*c* engages threadedly in a hole 201 of the engine 200. The pressure-detecting device 100 can be applied to a so-called combustion-pressure sensor to detect the pressure in the combustion chamber 202 (cylinder pressure) of the engine 200.

The housing 10 has a first hollow cylindrical division 10*a* and a second division 10*b*, and the second division 10*b* has the pipe section 10*c* which is thinner than the first division 10*a*. The first and second divisions 10*a* and 10*b* are made of a metal by cutting or cold forging.

The housing 10 is made of stainless steel or the like, and the one end of the first division 10*a* is inserted into an expanded section of the second division 10*b* by pressure fitting. Thus, the first division 10*a* is fixed to the second division 10*b*.

The first division 10*a* may be joined to the second division 10*b* by welding or gluing, or the former may threadedly engage in the latter.

The pipe section 10*c* has a male-thread section 11 on the periphery thereof and female threads are formed inside the hole 201 of the engine 200 so that the pipe section 10*c* can threadedly engage in the hole 201.

The pipe section 10*c* is inserted in the hole 201 and fixed in the hole 201 through the medium of the male-thread section 11 so that the tip 10*d* of the pipe section 10*c* faces the combustion chamber 202. Thus, the pressure-detecting device 100 is fitted to the engine 200.

A sensing unit 20 is fitted, threadedly or by press fitting, into the first division 10*a* of the housing 10. Thus, the sensing unit 20 is housed in the housing 10.

The sensing unit 20 comprises a hollow cylindrical metal stem 21 and a strain gauge 30. The metal stem 21 has an opening 22 at its top and a diaphragm 23 at its bottom as seen in FIG. 1. The strain gauge 30 is fixed on the diaphragm 23 with molten glass.

The metal stem 21 is a hollow cylindrical metal part, which is press-fitted into and fixed in the hollow of the first division 10*a* of the housing 10. The metal stem 21 may threadedly engage in the housing 10.

As shown in FIG. 1, the opening 22 of the metal stem 21 is disposed near the top of the first division 10*a* and the diaphragm 23 of the metal stem 21 is disposed near the bottom of the first division 10*a*.

The strain gauge 30 may be a silicon-semiconductor chip with a bridge circuit of diffused resistive elements, etc.

When the diaphragm 23 of the metal stem 21 deforms under pressure, the strain gauge 30 deforms and its resistance value changes accordingly. The change of the resistance value is converted into an electric signal and outputted. The diaphragm 23 of the metal stem 21 and the strain gauge 30 determine the basic performance of the pressure-detecting device 100.

The material of the metal stem 21 must be strong and of a low coefficient of thermal expansion because the metal stem 21 is exposed to high pressure and the strain gauge 30 comprising a silicon semiconductor, etc. has to be fixed to the metal stem 21 with glass of low melting point.

To be specific, the metal stem 21 may be made of an alloy of Fe, Ni, and Co or an alloy of Fe and Ni containing precipitation-enhancing materials of Ti, Nb, and Al or Ti and Nb. The metal stem 21 may be made by pressing, cutting, or cold forging.

A first circuit board 40 comprising a ceramic board, etc. is provided around the diaphragm 23 of the metal stem 21. The first circuit board 40 is fixed, by gluing, to the first division 10*a* of the housing 10.

The strain gauge 30 and the first circuit board 40 are electrically connected by bonding wires 42 of aluminum (Al), gold, or the like.

A second circuit board 50 comprising a ceramic board, etc. is disposed under the first circuit board 40 as seen in FIG. 1. An IC chip 44 is glued onto the top surface of the second circuit board 50 as seen in FIG. 1.

The IC chip 44 is provided with a circuit to amplify and modulate the signals outputted from the strain gauge 30. The second circuit board 50 and the IC chip 44 are electrically connected by bonding wires 42 of aluminum (Al), gold, or the like.

A spring 45 is provided between the first and second circuit boards 40 and 50 so as to connect them electrically.

The spring 45 is a conductive elastic body. For example, it is connected to one of the first and second circuit boards 40 and 50 by brazing or soldering and is kept in contact with the other board by its elasticity. Thus, the first and second circuit boards 40 and 50 are electrically connected.

A connector case 70 with a terminal 61 for external connection is provided on the bottom surface of the second circuit board 50.

The connector case 70 is made of PPS (polyphenylene sulfide) resin or the like. The terminal 61 is inserted in the connector case 70, both the parts formed as a unit.

A conductive connector 63 is disposed between the second circuit board 50 and the terminal 61 to connect them electrically. The conductive connector 63 may be a rubber block wherein a plurality of metallic pins are anisotropically arranged, or a spring, or a conductive adhesive.

The strain gauge 30, IC chip 44, first and second circuit boards 40 and 50, and terminal 61 may be connected by other means of connection than the above bonding wires 42, spring 45, and conductive connector 63.

As shown in FIG. 1, the bottom end 12 of the housing 10 is bent onto part of the connector case 70 so as to join the housing 10 and the connector case 70 as a unit. The terminal 61 can electrically be connected to the ECU of the vehicle through the medium of a cable or the like.

On the other hand, as shown in FIG. 1, the pipe section 10*c* of the second division 10*b* protrudes from the part of the housing 10 wherein the sensing unit 20 is housed.

A pressure-receiving diaphragm 13 is welded to the tip 10*d* of the pipe section 10*c*. The opening of the tip 10*d* is stopped up by the pressure-receiving diaphragm 13.

The pressure-receiving diaphragm 13 faces the inside of the combustion chamber 202 and is exposed to the pressure inside the combustion chamber 202 as shown by the arrow Y in FIG. 1. The pressure-receiving diaphragm 13 is made of stainless steel or the like.

A pressure-conveying member 80 is inserted in the pipe section 10*c*. The bottom end, as seen in FIG. 1, of the pressure-conveying member 80 is disposed on the side of the sensing unit 20 and the top end, as seen in FIG. 1, of the pressure-conveying member 80 is disposed on the side of the pressure-receiving diaphragm 13. The pressure-conveying member 80 is made of stainless steel or the like.

The bottom end of the pressure-conveying member 80 is inserted in the metal stem 21 so as to come in contact with and apply a load to the diaphragm 23. The top end of the pressure-conveying member 80 is inserted in the pipe section 10*c* so as to come in contact with and apply a load to the pressure-receiving diaphragm 13.

Thus, both the ends of the pressure-conveying member 80 are in contact with the diaphragms 13 and 23, applying certain loads to them, for the reason described below.

If both the ends of the pressure-conveying member 80 are in contact with the diaphragms 13 and 23, applying almost no loads to them, the pressure-conveying member 80 loses contact with at least one of the diaphragms 13 and 23 when the pressure-conveying member 80 contracts due to its linear expansion coefficient.

Besides, when the pressure inside the combustion chamber 202 becomes negative, the pressure-receiving diaphragm 13 bulges out into the combustion chamber 202 and may lose contact with the pressure-conveying member 80.

Thus, to secure the contact between the pressure-conveying member 80 and the diaphragms 13 and 23, both the ends of the former are put in contact with the latter so as to apply certain loads to the latter.

As described above, the rod-like pressure-conveying member 80 is so disposed that its one end is on the side of the sensing unit 20 and its other end extends out of the sensing unit 20, into and through the pipe section 10*c* in the hole 201 of the engine 200.

The pressure inside the combustion chamber 202 is conveyed to the sensing unit 20 through the pressure-receiving diaphragm 13 and the pressure-conveying member 80 as shown by the arrow in FIG. 1.

Then, the diaphragm 23 of the metal stem 21 deforms under the conveyed pressure and the strain gauge 30 deforms accordingly. An electric signal in accordance with the deformation of the strain gauge 30 is outputted from the strain gauge 30, and the combustion pressure is detected based on the signal.

Figure 5:
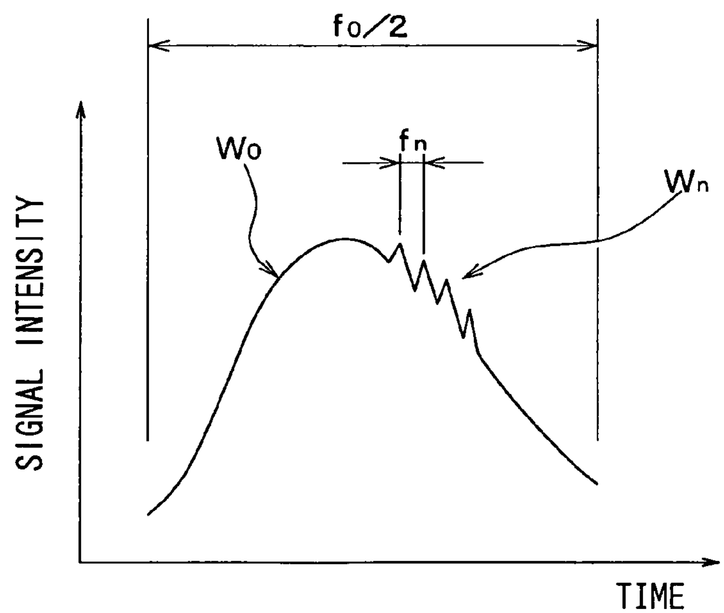
FIG. 5 is an illustration of the waveform of combustion pressure.

The pressure-conveying member 80 is designed to resonate at the frequency $f_n$ of knocking of the engine 200 (see FIG. 5), and the frequency $f_n$ of knocking is detected based on the resonance of the pressure-conveying member 80.

To make the pressure-conveying member 80 resonate at the knocking frequency $f_n$, the resonance frequency of the pressure-conveying member 80 is so adjusted that it is equal or near to the knocking frequency $f_n$.

The knocking frequency $f_n$ is a value peculiar to each engine and determined by the bore of the cylinder; therefore, the resonance frequency of the pressure-conveying member 80 is adjusted in accordance with the knocking frequency $f_n$ of the engine 200.

The resonance frequency of the pressure-conveying member 80 is adjusted and set at a frequency of the engine 200 at which there is no mechanical vibration of pistons, cylinders, etc. Namely, it is desirable to separate the resonance frequency of the pressure-conveying member 80 from the pseudo-knocking frequency of the engine 200 and set the resonance frequency nearer to the knocking frequency $f_n$.

The resonance frequency of the pressure-conveyi55ng member 80 may be adjusted as follows. The resonance frequency f of the pressure-conveying member 80 is represented by the expression below.

$$f=(1/2\pi)\cdot(k/m)^{1/2} \quad (1)$$

where m and k are the mass and the spring constant, respectively, of the pressure-conveying member 80. Accordingly, the resonance frequency f of the pressure-conveying member 80 can be adjusted by simply changing its length, diameter, material density, etc. to adjust its mass and spring constant.

Besides, the resonance frequency f of the pressure-conveying member 80 can be adjusted by making part or the whole of the pressure-conveying member 80 hollow. For example, a pipe-like pressure-conveying member 80 can easily be formed by extruding.

The pressure-conveying members of pressure-detecting devices of prior art are made of solid rods.

On the other hand, by making at least part of the pressure-conveying member 80 hollow, its weight can be reduced and its resonance frequency f can be changed without changing its length, diameter, or materials.

If the pressure-conveying member 80 is partly hollow, it may be made by joining a hollow section and a solid section, or by stuffing the hollow with the material constituting the pressure-conveying member 80 or another material having a resonance frequency similar to that of the material constituting the pressure-conveying member 80.

FIGS. 2A to 2E shows pressure-conveying members 80 of partly hollow construction. Each of the pressure-conveying members 80 of FIGS. 2A to 2E is made by inserting a solid rod 80*b* into a pipe or pipes 80*a* and welding or brazing them together.

Figure 3:
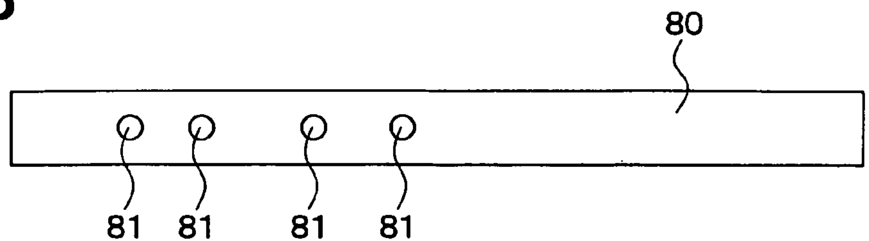
FIG. 3 is an illustration of another embodiment of the pressure-conveying member of the pressure-detecting device, the pressure-conveying member having depressions for the adjustment of weight.

Besides, as shown in FIG. 3, depressions 81 may be made in the surface of the pressure-conveying member 80 to reduce its weight. The depressions 81 may be made by cutting or pressing. In this case too, the weight of the pressure-conveying member 80 can be reduced and the resonance frequency f of the pressure-conveying member 80 can be changed without changing its length, diameter, or materials.

Accordingly, if knocking occurs, the pressure-conveying member 80 resonates at the knocking frequency $f_n$.

Then, the resonance is conveyed to the strain gauge 30 through the diaphragm 23 of the metal stem 21, the strain gauge 30 is deformed, and an electric signal in accordance with the deformation is outputted from the strain gauge 30.

An example of the method of assembling the pressure-detecting device 100 will now be described. First, the metal stem 21, to which the strain gauge 30 is fixed with molten glass, is press-fitted into the first division 10*a* of the housing 10.

Next, the first circuit board 40 is fixed to the first division 10*a* by gluing or otherwise to dispose the first circuit board 40 around the metal stem 21. Then, the first circuit board 40 and the strain gauge 30 are connected by the bonding wires 42.

The first circuit board 40 and the second circuit board 50, on which the IC chip 44 is mounted by wire bonding, are connected by the spring 45.

Then, the connector case 70 is fitted into the first division 10*a* of the housing 10 and the bottom end 12 of the first division 10*a* is bent onto part of the connector case 70 so as to fix the connector case 70 to the first division 10*a* together. Next, the second circuit board 50 and the terminal 61 are connected by the conductive connector 63.

Thus, the first division 10*a*, into which the sensing unit 20 and the circuit boards 40 and 50 are built, and the connector case 70 are assembled into a unit. On the other hand, the pressure-receiving diaphragm 13 is welded to the tip 10*d* of the pipe section 10*c* of the second division 10*b* by welding.

Next, one end of the pressure-conveying member 80 is inserted into the opening 22 of the metal stem 21 and the other end of the pressure-conveying member 80 is inserted in the pipe section 10*c*. Then, the first division 10*a* is press-fitted into the second division 10*b*. Thus, the pressure-detecting device 100 is completed.

The pressure-detecting device 100 is mounted on the engine 200 by threadedly engaging the male-thread section 11 of the housing 10 into the hole 201 of the engine 200.

When the pressure-receiving diaphragm 13 is exposed to the pressure inside the combustion chamber 202 as shown by the arrow Y in FIG. 1, the pressure is conveyed to the sensing unit 20 through the pressure-conveying member 80.

The pressure deforms the diaphragm 23 of the metal stem 21 and the strain gauge 30 converts the deformation into an electric signal and outputs the electric signal for the detection of the pressure. The electric signal is processed by the IC chip 44 and outputted to the outside through the terminal 61.

Figure 4:
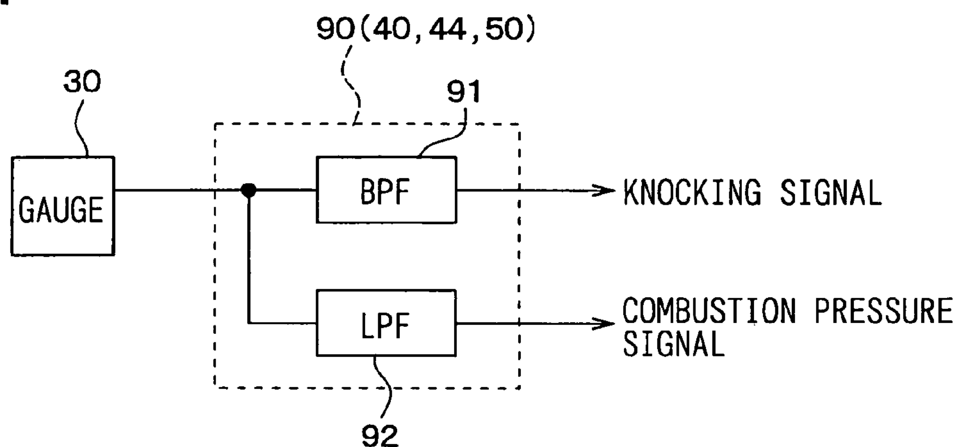
FIG. 4 is a block diagram of the detector circuit of the pressure-detecting device.

By referring to FIG. 4, the workings of the pressure-detecting device 100 will now be described more specifically. FIG. 4 shows the construction of the detector circuit 90 of the pressure-detecting device 100.

The detector circuit 90 is to detect the electric signals outputted from the strain gauge 30 and comprises the above IC chip 44 and first and second circuit boards 40 and 50.

As shown in FIG. 4, the detector circuit 90 includes a band-pass filter (BPF) 91 and a band-elimination filter (BEF) 92. The filter 92 may be a low-pass filter (LPF).

The band-pass filter 91 lets only the signals of knocking frequency $f_n$ (see FIG. 5) pass. The band-elimination or low-pass filter 92 eliminates the signals of knocking frequency $f_n$, etc. and lets the frequency signals of combustion pressure pass.

The electric signals outputted from the strain gauge 30 are sent to both the band-pass filter 91 and the band-elimination or low-pass filter 92.

Accordingly, if knocking occurs, the strain gauge 30 outputs an electric signal of frequency $f_n$ due to the resonance of the pressure-conveying member 80 and the electric signal passes the band-pass filter 91 and is detected as a knocking signal. Thus, the knocking is detected.

When knocking does not occur, the strain gauge 30 does not output an electric signal of frequency $f_n$ due to the resonance of the pressure-conveying member 80 and no signal passes the band-pass filter 91. Thus, no knocking is detected.

On the other hand, because signals of combustion pressure pass the band-elimination or low-pass filter 92, they can be detected as signals from which signals of knocking frequency $f_n$ are eliminated if knocking occurs.

As described above, according to the first embodiment of the present invention, there is provided the pressure-detecting device 100 comprising (i) the sensing unit 20 which outputs signals in accordance with pressure and (ii) the rod-like pressure-conveying member 80 of which one end is disposed in the sensing unit 20 and of which the other end extends out of the sensing unit 20, into and through the hole 201 of the engine 200. The combustion pressure, to which the top end (as seen in FIG. 1) of the pressure-conveying member 80 is exposed, is conveyed through the pressure-conveying member 80 to the sensing unit 20 for the detection of the combustion pressure. The feature of the pressure-detecting device 100 is that the pressure-conveying member 80 resonates at the knocking frequency $f_n$ of the engine 200 and the knocking frequency $f_n$ of the engine 200 is detected based on the resonance of the pressure-conveying member 80.

Because the knocking frequency $f_n$ can be extracted based on the resonance of the pressure-conveying member 80, it will do for the detection of knocking if it is checked whether a signal of knocking frequency $f_n$ has been outputted or not, no matter how large or small the amplitude of the signal of knocking frequency $f_n$ is.

Accordingly, the pressure-detecting device 100 is capable of detecting knocking more reliably than the pressure-detecting devices of the prior art.

Namely, as described earlier, the resonance frequency of the pressure-conveying member of the pressure-detecting device of the prior art is kept away from the frequency band of knocking so that the noise due to the resonance of the pressure-conveying member does not overlap the pressure signals of knocking. According to the first embodiment of the present invention, however, the pressure-conveying member 80 is allowed to resonate with knocking and a signal of the resonance frequency is detected.

If the pressure-conveying member 80 with depressions 81 for the adjustment of weight of FIG. 3 is used, the depressions 81 may be made before the pressure-detecting device 100 is mounted on the engine 200 as shown in FIG. 1 or they may be made after the pressure-detecting device 100 is mounted on the engine 200 as shown in FIG. 1.

In the latter case, the housing 10 has suitably disposed holes. After the pressure-detecting device 100 is mounted on the engine 200, a cutting tool is inserted into each hole to make a depression 81.

(Modifications)

Although the housing 10 of the above pressure-detecting device 100 is divided into the first division 10*a* holding the sensing unit 20 and the second division 10*b* fitted with the pressure-receiving diaphragm 13, the housing 10 may be formed in one piece.

Although the above sensing unit 20 comprises a metal stem 21 and a strain gauge 30, the sensing unit 20 may be constructed otherwise so long as it outputs signals in accordance with the pressure conveyed through the pressure-conveying member 80.

Although there are provided the circuit boards 40 and 50, IC chip 44, bonding wires, etc. between the sensing unit 20 and the connector case 70 in FIG. 1, the construction can be changed.

The construction of the detector circuit 90 is not limited to the construction shown in FIG. 4 so long as the detector circuit 90 is capable of detecting knocking frequency $f_n$ based on the resonance of the pressure-conveying member 80.

The main part of the present invention is that the combustion pressure of the engine 200 is conveyed to the sensing unit 20 through the rod-like pressure-conveying member 80 and that the pressure-conveying member 80 is allowed to resonate at the frequency $f_n$ of the knocking of the engine 200 and the frequency $f_n$ of the knocking is detected based on the resonance of the pressure-conveying member 80. The other part of the present invention can be changed appropriately.

(Second Embodiment)

Figure 6:
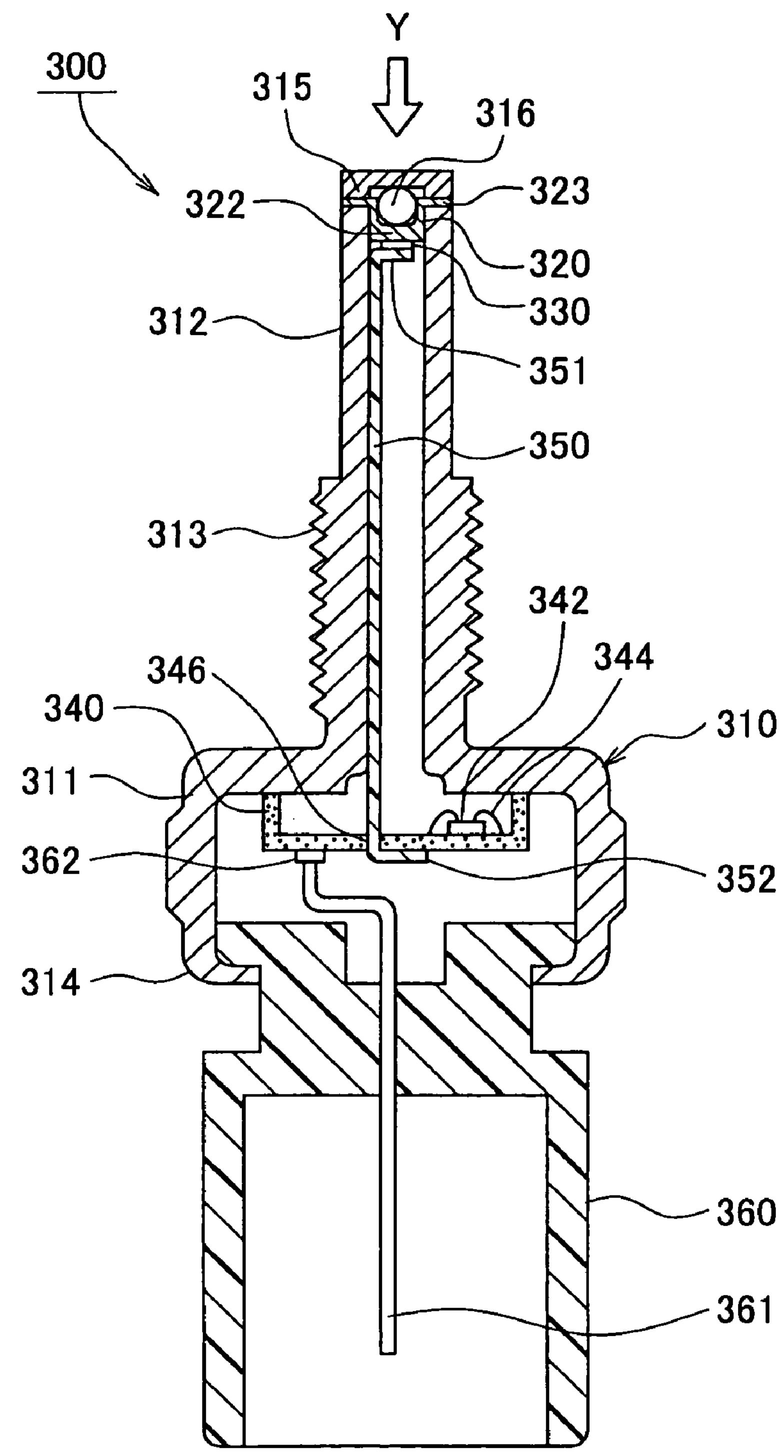
FIG. 6 is a schematic sectional view of the second embodiment of the pressure-detecting device of the present invention.
Figure 7:
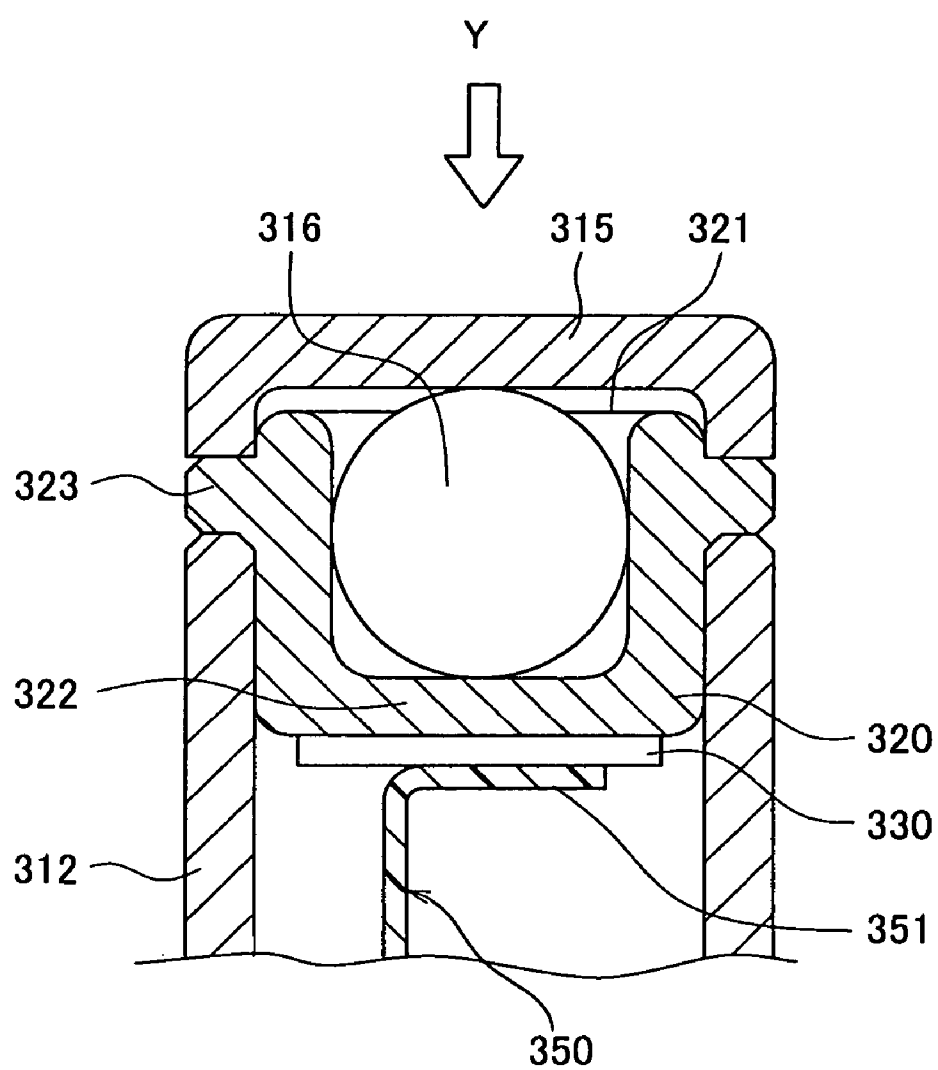
FIG. 7 is an enlarged schematic sectional view of the tip portion of the pipe section shown in FIG. 6.

FIG. 6 is a schematic sectional view showing a whole configuration of the second embodiment of pressure-detecting device 300 of the present invention. FIG. 7 is an enlarged schematic sectional view of the tip portion of the pipe section 312 shown in FIG. 6.

The pressure-detecting device 300 can be used as a combustion-pressure sensor. In this case, the pipe section 312 is threadedly engaged with a threaded hole of the engine block of an engine and the pressure-detecting device 300 detects the pressure inside the combustion chamber of the engine.

The pressure-detecting device 300 has a housing 310 which comprises a hollow cylindrical body 311 and the above pipe section 312 which is in the shape of a thin, long hollow cylinder and thinner than the body 311. The body 311 and the pipe section 312 are made of stainless steel or the like by cutting or cold forging. The pipe section 312 may be in the shape of a rectangular pipe.

The housing 310 may be made in one piece, or it may be made by making the body 311 and the pipe section 312 separately and then joining them together by welding, gluing or press-fitting, or threadedly, or otherwise.

Besides, a male-thread section 313 is formed on the periphery of the pipe section 312 for the thread engagement with the engine block. Thus, the housing 310 is constructed to have the thin, long pipe section 312 which protrudes from its one end.

The pressure-detecting device 300 is mounted on the engine block by threadedly engaging the male-thread section 313 in the above threaded hole of the engine block.

The pressure inside the combustion chamber works on the tip of the pipe section 312 as shown by the arrows in FIGS. 6 and 7.

The tip of the pipe section 312 is fitted with a pressure-sensing element 330 which outputs signals in accordance with pressure. The pressure-sensing element 330 may have a strain gauge's function of deforming under pressure and outputting a signal proportional to the magnitude of the pressure based on the magnitude of the deformation.

To be specific, as shown in FIG. 7, the pressure-sensing element 330 is fitted, with molten glass or otherwise, onto the bottom surface of a diaphragm 322 of a hollow cylindrical metal stem 320. The metal stem 320 is the above support and has an opening 321 at its top and the diaphragm 322 at its bottom as seen in FIG. 7.

A flange 323 protruding outward is formed around the opening 321 of the metal stem 320. The metal stem 320 may be in the shape of a rectangular pipe.

The part of the metal stem 320 under the flange 323 is inserted in the tip of the pipe section 312. The flange 323 of the metal stem 320 and the tip of the pipe section 312 are joined together by gluing, welding, pressure welding, or the like.

As shown in FIG. 7, a diaphragm 315 is provided on the top of the metal stem 320 so as to cover the opening 321. The diaphragm 315 is hereinafter referred to as "pressure-receiving diaphragm 315" to distinguish it from the diaphragm 322 of the metal stem 320.

The pressure-receiving diaphragm 315 is made of a metal such as stainless steel and in the shape of a disk, and its periphery is welded to the flange 323 of the metal stem 320.

Thus, the pressure-receiving diaphragm 315 and the metal stem 320 are joined together. The pressure-receiving diaphragm 315 faces the combustion chamber and the combustion pressure works on it as shown by the arrows in FIGS. 6 and 7.

As shown in FIG. 7, a pressure-conveying member 316 is provided in the hollow of the metal stem 320. Namely, the pressure-conveying member 316 lies between the pressure-receiving diaphragm 315 and the pressure-sensing element 330. The pressure-conveying member 316 is made of ceramic or metal.

The bottom, as seen in FIG. 7, of the pressure-conveying member 316 is in contact with and applies a load to the diaphragm 322, and the top, as seen in FIG. 7, of the pressure conveyor 316 is in contact with and applies a load to the pressure-receiving diaphragm 315.

Accordingly, if the pressure-conveying member 316 contracts due to its linear expansion coefficient or if the pressure inside the combustion chamber becomes negative, the contact between the pressure-conveying member 316 and the diaphragms 315 and 322 is suitably maintained.

Although the pressure-conveying member 316 of FIG. 7 is in the shape of a sphere, it may be in any shape. The pressure inside the combustion chamber is conveyed from the pressure-receiving diaphragm 315 to the pressure-sensing element 330 through the pressure-conveying member 316 and the diaphragm 322.

The pressure-sensing element 330 with the function of a strain gauge may be a silicon-semiconductor chip with a bridge circuit of diffused resistive elements, etc.

When the diaphragm 322 deforms under pressure, the pressure-sensing element 330 with the function of a strain gauge deforms accordingly, converts the change of its resistance due to its deformation into an electric signal, and outputs the electric signal.

The diaphragm 322 of the metal stem 320 and the pressure-sensing element 330 constitute a deforming unit which deforms under pressure. This deforming unit determines the basic performance of the pressure-detecting device 300.

The material of the metal stem 320 must be strong and of a low coefficient of thermal expansion because the metal stem 320 is exposed to high pressure and the pressure-sensing element 330 comprising a silicon semiconductor, etc. has to be fixed to the diaphragm 322 with glass of low melting point.

To be concrete, the metal stem 320 may be made of an alloy of Fe, Ni, and Co or an alloy of Fe and Ni containing precipitation-enhancing materials of Ti, Nb, and Al or Ti and Nb, such as precipitation-hardening stainless steel. The metal stem 320 may be made by pressing, cutting, or cold forging.

As shown in FIG. 6, a circuit board 340 consisting of a ceramic board, etc. is provided in the body 311 of the housing 310. The circuit board 340 is disposed to cover the lower opening of the pipe section 312. The periphery of the circuit board 340 is fixed to the housing 310 by gluing or otherwise.

An IC chip 342 is fixed onto the upper surface of the circuit board 340 by gluing or the like, and formed on the IC chip 342 is a circuit to amplify and modulate signals outputted from the pressure-sensing element 330.

The circuit board 340 and the IC chip 342 are electrically connected by bonding wires 344 of aluminum, gold, or the like. Besides, the pressure-sensing element 330 and the circuit board 340 are electrically connected by a wiring member 350.

The wiring member 350 of FIGS. 6 and 7 is a flexible printed circuit board (FPC) 350, but may be a lead wire or the like.

The flexible printed circuit board 350 may be a baseboard of polyimide resin on which a circuit of a conductor such as copper is laid. As shown in FIG. 6, the flexible printed circuit board 350 is so disposed that it extends in the longitudinal direction of the pipe section 312.

The upper and lower ends 351 and 352, as seen in FIG. 6, of the flexible printed circuit board 350 are bent. The upper bent end 351 is electrically and mechanically joined to the pressure-sensing element 330 by soldering or the like. To be specific, although not shown, conducting part of the upper bent end 351 is joined to a pad formed on the bottom surface of the pressure-sensing element 330.

The part of the flexible printed circuit board 350 under the upper bent end 351 extends through the pipe section 312 toward the circuit board 340.

The flexible printed circuit board 350 extends downward through a hole 346 made in the circuit board 340 so that the lower bent end 352 is disposed on the bottom surface of the circuit board 340.

The lower bent end 352 of the flexible printed circuit board 350 is electrically connected to the bottom surface of the circuit board 340 by soldering or the like.

As shown in FIG. 6, a connector case 360 with a terminal 361 is disposed below the circuit board 340.

The connector case 360 is made of PPS (polyphenylene sulfide) resin or the like. The terminal 361 is inserted in the connector case 360, both the parts formed as a unit. The connector case 360 is provided as a connector unit to take out signals from the pressure-sensing element 330.

The circuit board 340 and the terminal 361 are electrically connected by a spring 362. Thus, the pressure-sensing element 330 is electrically connected to the terminal 361 through the flexible printed circuit board 350 and the circuit board 340.

As shown in FIG. 6, the bottom end 314 of the body 311 of the housing 310 is bent onto part of the connector case 360 so that they are fixed together as a unit.

The terminal 361 can electrically be connected to the ECU or the like of the vehicle through a cable or the like (not shown). Thus, the pressure-detecting device 300 can send signals to and receive signals from the outside.

Now, by referring to FIGS. 8A to 8D, the process of making the pressure-detecting device 300 will be described. FIG. 8 is a process drawing to illustrate the process of making the pressure-detecting device 300 and relates mainly to the welding of the pressure-sensing element 330.

Figure 8A:
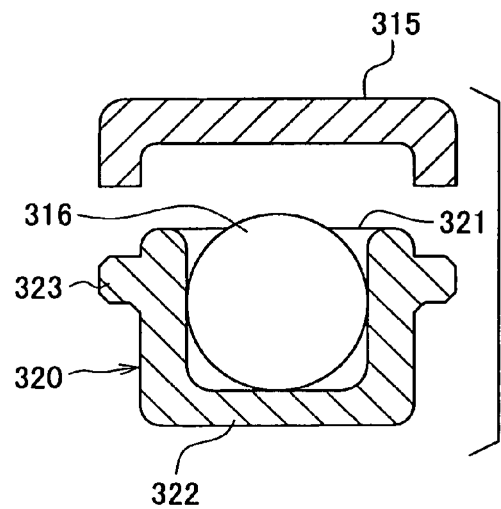
FIGS. 8A to 8D are cross sectional view for illustrating the process of manufacturing the pressure-detecting device according to the above embodiment.

First, as shown in FIG. 8A, the pressure-conveying member 316 is put between the metal stem 320 and the pressure-receiving diaphragm 315. To be specific, the pressure-conveying member 316 is put in the metal stem 320 and the pressure-receiving diaphragm 315 is put on the metal stem 320 so that the pressure-receiving diaphragm 315 covers the opening 321 of the metal stem 320.

Next, while a load is applied from the pressure-receiving diaphragm 315 to the diaphragm 322 through the pressure-conveying member 316, the pressure-receiving diaphragm 315 is welded to the flange 323 of the metal stem 320. Thus, the pressure-receiving diaphragm 315 and the metal stem 320 are joined together.

Namely, while a downward load and a upward load are applied from the pressure-receiving diaphragm 315 and the diaphragm 322, respectively, to the pressure-conveying member 316, the entire periphery of the pressure-receiving diaphragm 315 is welded to the flange 323 by laser welding or the like.

Figure 8B:
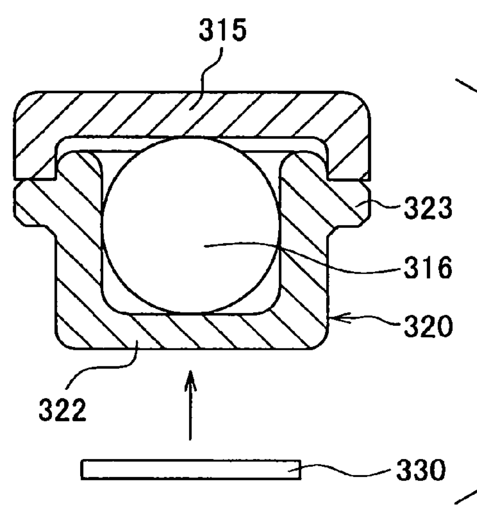

Thus, the pressure-receiving diaphragm 315, pressure-conveying member 316, and metal stem 320 are assembled into a single unit. Then, as shown in FIG. 8B, the metal stem 320 is fitted with the pressure-sensing element 330.

To be specific, glass of low melting point is put on the bottom surface of the diaphragm 322 and the pressure-sensing element 330 is put on the glass. Then, the glass is burned to fix the pressure-sensing element 330 to the bottom surface of the diaphragm 322 with the molten glass.

Figure 8C:
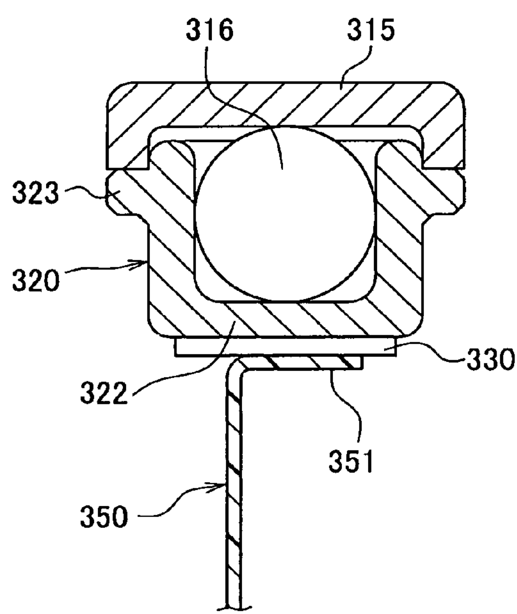

Next, as shown in FIG. 8C, the upper bent end 351 of the flexible printed circuit board 350 is connected to the pressure-sensing element 330 by soldering or the like.

Figure 8D:
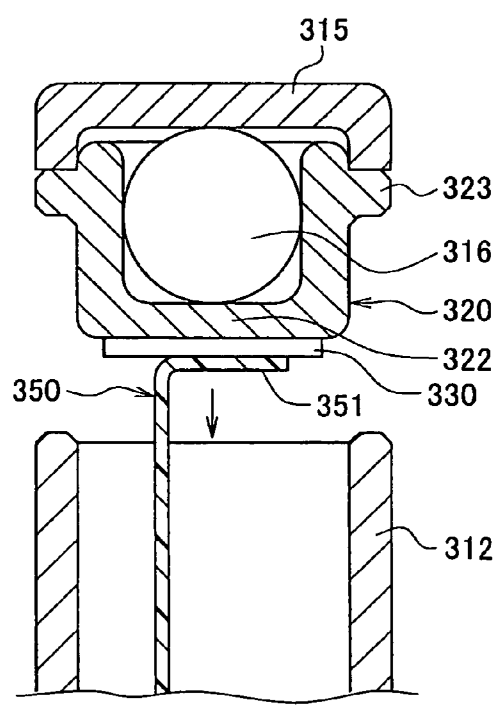

Then, as shown in FIG. 8D, the flexible printed circuit board 350 is inserted in the pipe section 312 and the lower end 352 of the flexible printed circuit board 350 is inserted into the hole 346 of the circuit board 340.

Then, the lower end 352 of the flexible printed circuit board 350 is bent and the lower bent end 352 is joined to the circuit board 340 by soldering.

Next, the circuit board 340 is joined and fixed to the body 311 of the housing 310. Thereafter, the connector case 360 is fitted to the body 311 of the housing 310 and the bottom end 314 of the body 311 is bent onto part of the connector case 360. Thus, the housing 310 and the connector case 360 are joined together.

When the connector case 360 and the housing 310 are joined together, the circuit board 340 and the terminal 361 are electrically connected by the spring 362. Thus, the pressure-detecting device 300 is completed as shown in FIG. 6.

The pressure-detecting device 300 is mounted on the engine block by threadedly engaging the male-thread section 313 in the above threaded hole of the engine block.

The pressure inside the combustion chamber works on the pressure-receiving diaphragm 315 as shown by the arrows in FIGS. 6 and 7. The pressure is conveyed through the pressure-conveying member 316 to the diaphragm 322 of the metal stem 320. The diaphragm 322 deforms under the pressure, and pressure-sensing element 330 converts the deformation into an electric signal for the detection of the pressure.

The electric signal is sent to circuit board 340 through the flexible printed circuit board 350 and processed by the IC chip 342, and the processed signal is outputted to the outside through the terminal 361.

The above process of making the pressure-detecting device 300 is characterized by the following feature.

The feature is that (i) the pressure-conveying member 316 is put between the pressure-receiving diaphragm 315 and the metal stem 320, (ii) the pressure-receiving diaphragm 315 is welded to the metal stem 320 while the pressure-receiving diaphragm 315 applies a load to the metal stem 320 through the pressure-conveying member 316, and (iii) the pressure-sensing element 330 is fixed to the metal stem 320.

Thus, the pressure-receiving diaphragm 315 is welded to the metal stem 320 while the pressure-receiving diaphragm 315 applies a load to the metal stem 320 through the pressure-conveying member 316, before the pressure-sensing element 330 is fixed to the metal stem 320.

Therefore, the contact between the pressure-conveying member 316 and the pressure-receiving diaphragm 315 and the contact between the pressure-conveying member 316 and metal stem 320 are properly secured. If the pressure-conveying member 316 contracts due to its linear expansion coefficient or if the pressure inside the combustion chamber becomes negative, the contact between the pressure-conveying member 316 and the pressure-receiving diaphragm 315 and the contact between the pressure-conveying member 316 and metal stem 320 are maintained.

Besides, when the pressure-receiving diaphragm 315 is welded to the metal stem 320 while the pressure-receiving diaphragm 315 applies a load to the metal stem 320 through the pressure-conveying member 316, the pressure-sensing element 330 is not yet fixed to the metal stem 320. Therefore, the pressure-sensing element 330 is free from thermal damage and any load.

Thus, when the pressure-receiving diaphragm 315 is welded to the metal stem 320, the pressure-sensing element 330 is prevented from being thermally damaged and being exposed to a load which may cause an offset.

The pressure-conveying member 316 may be in the shape of a rod as in the cases of prior art.

In the case of spherical pressure-conveying member 316 of FIGS. 6 and 7, the pressure-conveying member 316 stays in stable point-contact with the pressure-receiving diaphragm 315 and the diaphragm 322 of the metal stem 320 and the number of contact spots between the pressure-conveying member 316 and the diaphragms 315 and 322 can be reduced.

Therefore, the change of condition of contact between the pressure-conveying member 316 and the diaphragms 315 and 322 can be kept under control, stable condition of contact can be secured at each contact point, and deterioration in the pressure-conveying precision can be prevented.

The spherical pressure-conveying member 316 does not deform easily as compared with rod-shaped ones of prior art. This fact too contributes to stable condition of contact between the spherical pressure-conveying member 316 and the diaphragms 315 and 322.

The pressure-conveying member 316 shown in FIGS. 6 and 7 is in the shape of a perfect sphere, but it may be in the shape of a sphere deformed to some extent; i.e., an oval sphere or a rugby ball.

The pressure-conveying member 316 may be a pillar with round ends for point contact with the pressure-receiving diaphragm 315 and the diaphragm 322 of the metal stem 320.

The pressure-sensing element 330 is disposed near to the pressure-receiving diaphragm 315 to reduce the length of the pressure-conveying member 316 as compared with the pressure-conveying members of prior art. In this example, the pressure-conveying member 316 is housed in the metal stem 320, the former being as substantially short as the latter.

Thus, the problems of resonance and deformation liable to occur to long pressure-conveying members can be prevented, which contributes to the improvement of the characteristics of the pressure-sensing element 330 and the sensitivity of the pressure-detecting device 300.

Figure 9:
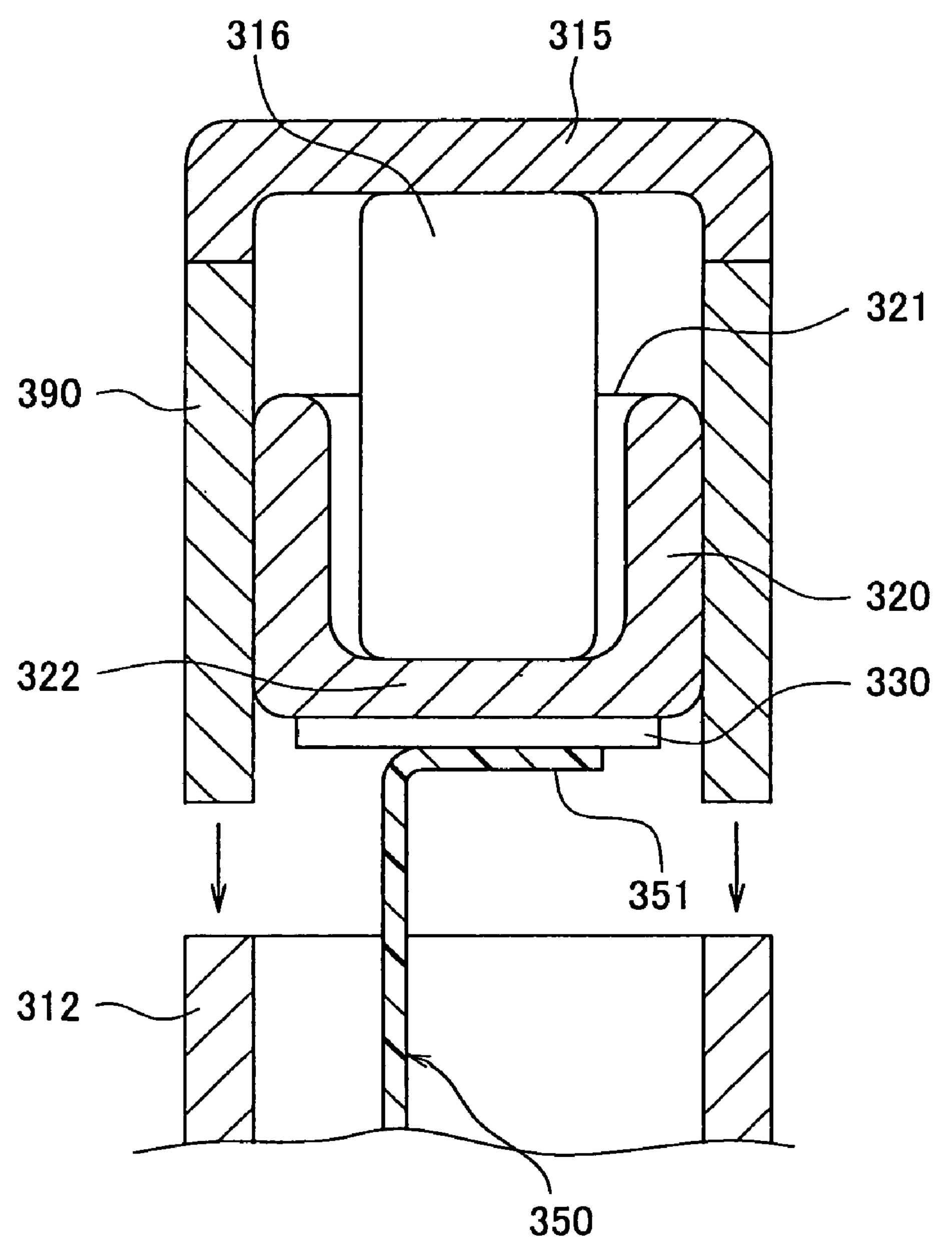
FIG. 9 is a schematic sectional view of a modification of the above embodiment.
Figure 10:
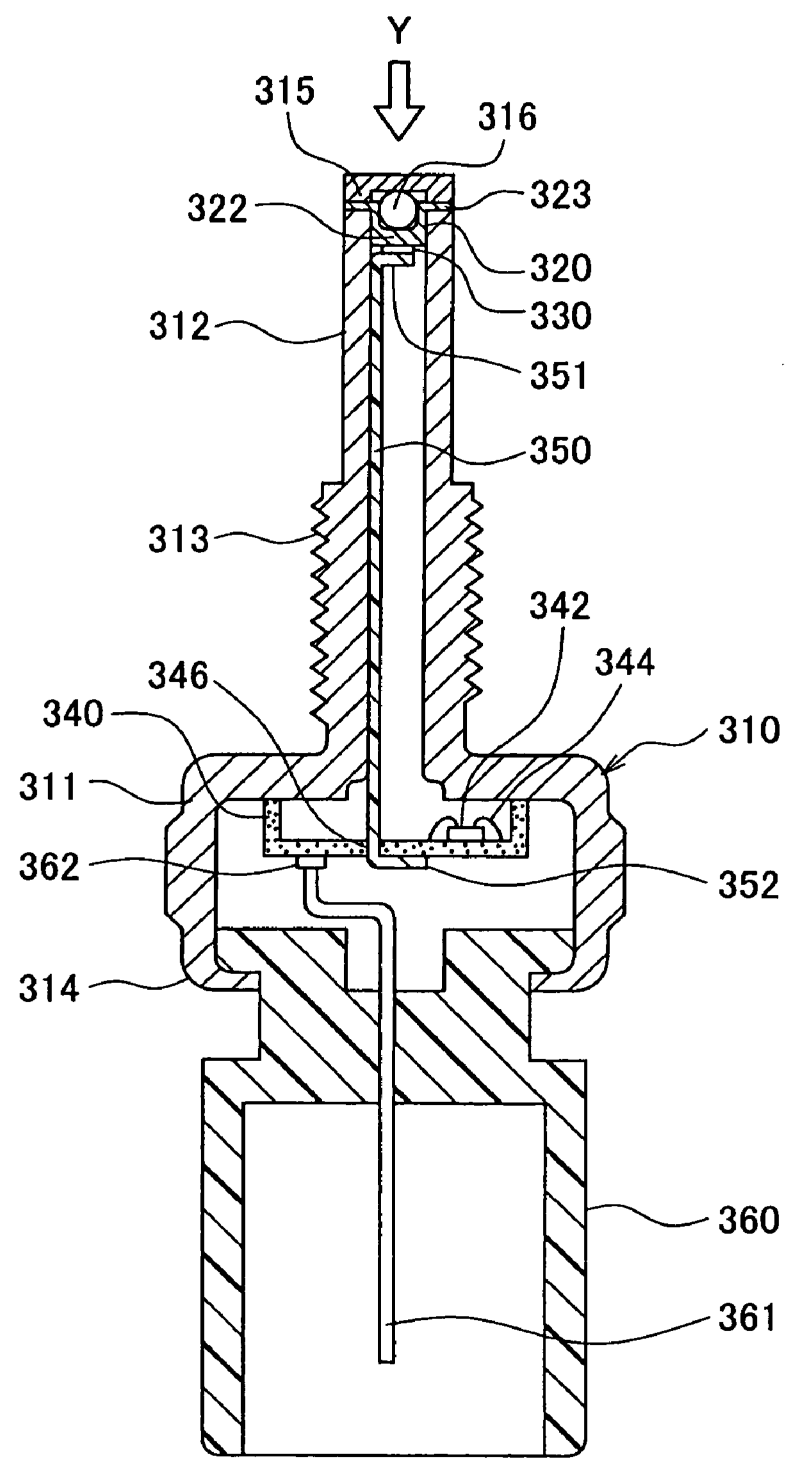
FIG. 10 is a schematic sectional view of a pressure-detecting device built as a prototype by the present inventor.

FIG. 9 is a schematic sectional view of a modified version of the second embodiment of the present invention.

In the second embodiment shown in FIGS. 6 and 7, the metal stem 320 are formed as a support and the pressure-receiving diaphragm 315 is welded to the flange 323 of the metal stem 320.

In the modified version of the second embodiment of FIG. 9, the metal stem 320 is fixed, by gluing or welding, to the inside of a pipe 390 of a diameter similar to that of the pipe section 312 and the pressure-receiving diaphragm 315 is welded to the pipe 390. The pressure-conveying member 316 is cylindrical.

The pipe 390 and the metal stem 320 constitute a support. After the metal stem 320 is fixed to the inside of a pipe 390, the pressure-conveying member 316 is put between the metal stem 320 and the pressure-receiving diaphragm 315 and the pressure-receiving diaphragm 315 is welded to the pipe 390 while a load is applied to the pressure-conveying member 316.

Then, the pressure-sensing element 330 is fixed to the metal stem 320 with molten glass, the flexible printed circuit board 350 is joined to the pressure-sensing element 330, the flexible printed circuit board 350 is inserted in the pipe section 312, and the pipe 390 and the pipe section 312 are joined together.

(Other Embodiments)

The support is not limited to the above metal stem 320 or the above assembly of the metal stem 320 and the pipe 390.

Any support will do if (i) it is capable of supporting the pressure-sensing element 330 and conveying the pressure from the pressure-conveying member 316 to the pressure-sensing element 330 and (ii) the pressure-receiving diaphragm 315 can be welded to it.

The pressure-sensing element 330 does not need to have the function of a strain gauge. Any pressure-sensing element will do if it can be fixed to the metal stem 320 and output a signal in accordance with the pressure from the pressure-conveying member 316.

Further, according to the above embodiment, the housing 310 has the long pipe section 312. Since the tip of the pipe section 312 is provided with the pressure-sensing element 330, metal stem 320, and pressure-receiving diaphragm 315, the pressure-sensing element 330 and the circuit board 340 are connected through the flexible printed circuit board 350.

However, the distance between the pressure-sensing element 330 and the circuit board 340 on the side of the connector unit may be decreased by modifying the shape of the housing to minimize the length of the pipe section or eliminating the pipe section so that the pressure-sensing element 330 and the circuit board 340 can be connected by bonding wires or the like.

According to the embodiment shown in FIG. 6, there are provided the IC chip 342, circuit boards 340, and various electric connectors between the pressure-sensing element 330 and the connector unit 360 in the housing 310. However, the construction of this section is not limited to the above and it can be changed appropriately.

The main part of the present invention is that, in a method for manufacturing a pressure-detecting device wherein the pressure-sensing element 330 is fixed to the support 320 and the pressure-receiving diaphragm 315 is welded to the support 320 while the pressure-conveying member 316 being between the pressure-sensing element 330 and the pressure-receiving diaphragm 315, the pressure-sensing element 330 is fixed to the support 320 after the pressure-receiving diaphragm 315 is welded while the pressure-conveying member 316 is put between the support 320 and the pressure-receiving diaphragm 315 and while the pressure-receiving diaphragm 315 applies a load to the support 320 through the pressure-conveying member 316. The other part of the present invention can be changed appropriately.

Further, it is needless to say that the pressure-detecting device of the present invention is not limited to the sensor of combustion pressure (cylinder pressure) described above.

What is claimed is:

1. A pressure-detecting device comprising:

a sensing unit outputting signals in accordance with pressure, and a pressure-conveying member having one end disposed in the sensing unit and the other end extending into and through an insertion hole of an engine in such a manner that a combustion pressure is conveyed through the pressure-conveying member to the sensing unit for detecting the combustion pressure;

wherein the pressure-conveying member resonates at a knocking frequency of the engine and the knocking frequency is detected based on the resonance of the pressure-conveying member.

2. A pressure-detecting device according to claim 1, wherein at least a part of the pressure-conveying member is hollow.

3. A pressure-detecting device according to claim 1, wherein depressions are made in the pressure-conveying member to adjust its weight.

4. A pressure-detecting device according to claim 1, wherein the said pressure-conveying member is a rod.

* * * * *